(12) United States Patent
Mitamura et al.

(10) Patent No.: US 7,769,324 B2
(45) Date of Patent: Aug. 3, 2010

(54) IMAGE FORMING APPARATUS, DRIVE MECHANISM OF IMAGE FORMING APPARATUS AND MANUFACTURING METHOD OF A WORM GEAR SET

(75) Inventors: Yoshihiko Mitamura, Ebina (JP); Susumu Kibayashi, Ebina (JP); Itaru Satoh, Ebina (JP); Norio Hokari, Ebina (JP); Yutaka Morita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/155,429

(22) Filed: Jun. 4, 2008

(65) Prior Publication Data
US 2009/0028605 A1 Jan. 29, 2009

Related U.S. Application Data

(62) Division of application No. 10/836,258, filed on May 3, 2004, now abandoned.

(30) Foreign Application Priority Data

Sep. 18, 2003 (JP) .............................. 2003-325784

(51) Int. Cl.
*G03G 15/00* (2006.01)
(52) U.S. Cl. ...................................... 399/167
(58) Field of Classification Search ................. 399/167; 409/48, 64–78
See application file for complete search history.

(56) References Cited

U.S. PATENT DOCUMENTS

| | | |
|---|---|---|
| 4,886,392 A | 12/1989 | Iio |
| 5,084,965 A | 2/1992 | Zimmern |
| 5,589,111 A | 12/1996 | Haruta et al. |
| 5,797,180 A | 8/1998 | Buchholz |
| 5,933,687 A * | 8/1999 | Okuno et al. ............... 399/167 |
| 6,007,446 A * | 12/1999 | Lang et al. .................. 475/149 |
| 6,752,035 B2 * | 6/2004 | Noguchi et al. ............... 74/461 |

FOREIGN PATENT DOCUMENTS

| | | |
|---|---|---|
| JP | 63-11967 | 1/1988 |
| JP | 63-057380 | 4/1988 |
| JP | 01-235617 | 9/1989 |
| JP | 08-312757 | 11/1996 |

(Continued)

*Primary Examiner*—David M Gray
*Assistant Examiner*—Ruth N Labombard
(74) *Attorney, Agent, or Firm*—Morgan, Lewis & Bockius LLP

(57) ABSTRACT

An image forming apparatus has a plurality of image carriers, a common drive source which drives the plurality of image carriers and a drive shaft that is connected to and driven by the drive source. It also has a plurality of worm gears that are provided corresponding to the plurality of image carriers and are formed coaxially with the drive shaft, and a plurality of worm wheels that are respectively meshed with the respective worm gears and respectively transmit drive forces of the worm gears to the image carriers. The plurality of worm gears are made of a resin material, and the worm gears and the worm wheels drive the plurality of image carries by making use of the elastic deformation of the worm gears when the worm gears and the worm wheels are respectively meshed with each other.

7 Claims, 9 Drawing Sheets

FOREIGN PATENT DOCUMENTS

| | | |
|---|---|---|
| JP | 11-218192 | 8/1999 |
| JP | 2000-131918 | 5/2000 |
| JP | 2000-152559 | 5/2000 |
| JP | 2001-065666 | 3/2001 |
| JP | 2001-165149 | 6/2001 |
| JP | 2002-357261 | 12/2002 |
| JP | 2003-080564 | 3/2003 |

* cited by examiner

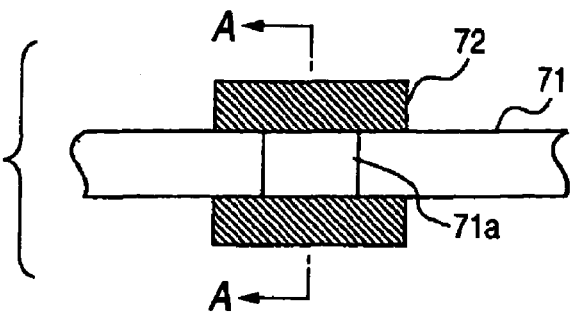 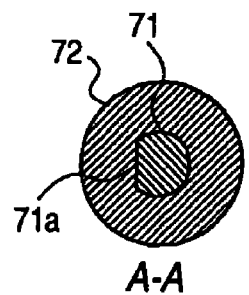
FIG. 4A
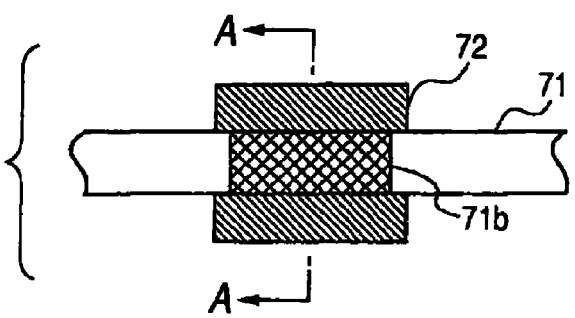 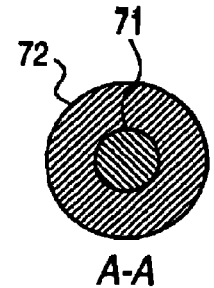
FIG. 4B
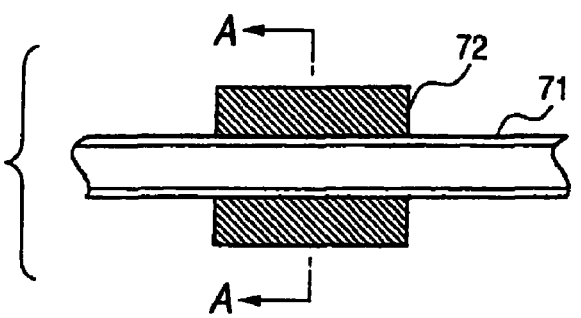 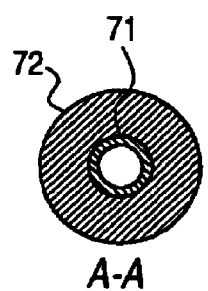
FIG. 4C
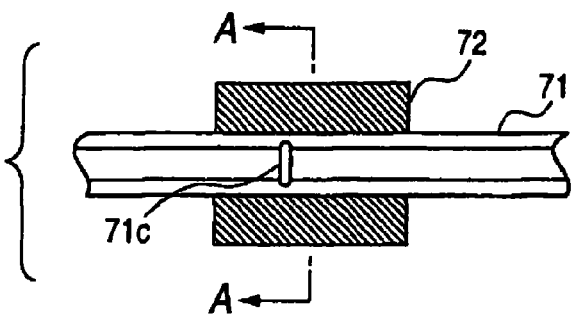 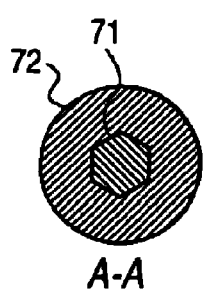
FIG. 4D

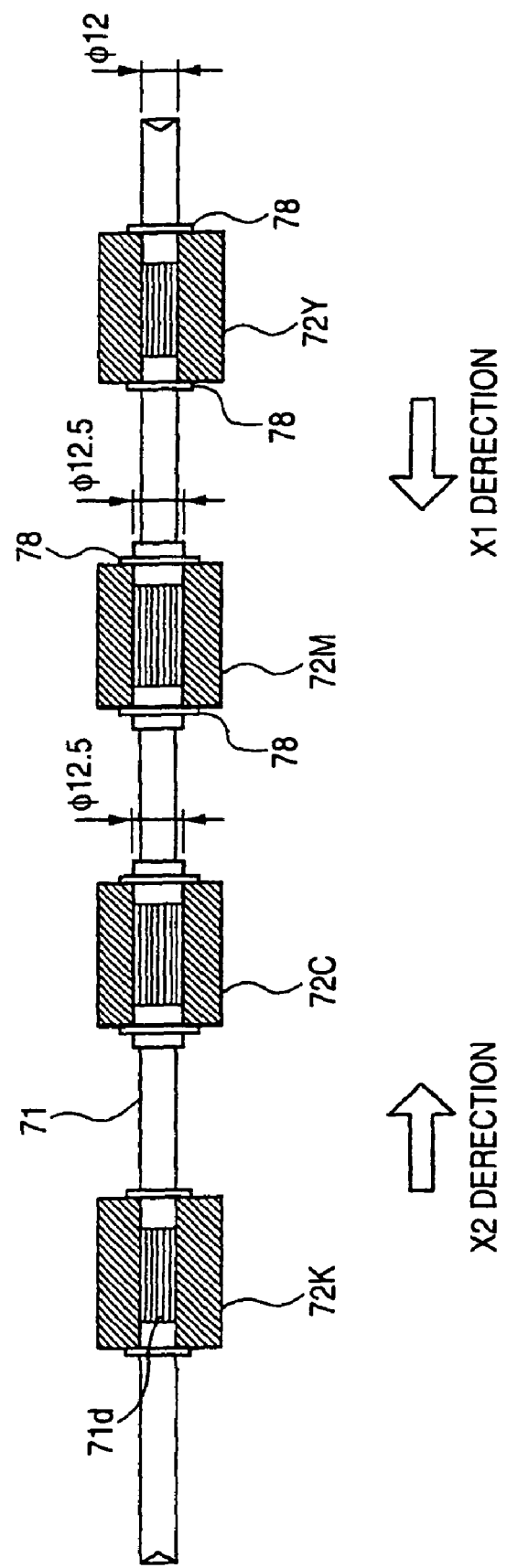

IMAGE FORMING APPARATUS, DRIVE MECHANISM OF IMAGE FORMING APPARATUS AND MANUFACTURING METHOD OF A WORM GEAR SET

This is a divisional application of application Ser. No. 10/836,258, filed on May 3, 2004, now abandoned which is incorporated by reference herein in its entirety.

BACKGROUND OF THE INVENTION

1. Field of the Invention

The present invention relates to an image forming apparatus or the like which is used in a printer, a copier, a facsimile or the like, and more particularly to an image forming apparatus or the like in which plural image carriers are arranged in parallel.

2. Description of the Related Art

As an image forming apparatus using an electrophotographic method, a so-called tandem-type image forming apparatus in which plural image forming units of yellow, magenta, cyan and black are arranged in parallel is popularly used. In the tandem-type image forming apparatus, in general, a photosensitive drum having a photosensitive layer on an outer peripheral surface thereof is provided to each image forming unit. At a position which faces the photosensitive drums in an opposed manner, a transfer belt which is extended over plural expansion rolls is arranged. Toner images of respective colors which are formed over the respective photosensitive drums are sequentially transferred onto the transfer belt directly or by way of a recording sheet (various types of sheets including a sheet, an OHP sheet or the like) in a multiplied manner. Further, there also exists an image forming apparatus in which a transfer roll which is brought into contact with each photosensitive drum is provided for every image forming unit and a transfer action of a recording material is performed by the photosensitive drum and the transfer roll.

In this tandem-type image forming apparatus, it is necessary to transfer respective color-component images formed by the respective image forming units to a same image carrier position of the transfer belt or a same recording material in a sequentially overlapped manner and hence, there arises a drawback that the registration of the respective color-component images is difficult. Accordingly, with respect to techniques described in publications on the related art, there exists a technique in which a single drive motor is used as a drive system and plural photosensitive drums which are arranged in parallel are driven by the single drive motor. To be more specific, there exists the technique in which plural worm gears are mounted on a rotary drive shaft which is connected to and rotatably driven by the drive motor, worm wheels are mounted on rotary shafts of the respective photosensitive drums, and the worm gears and the worm wheels are meshed with each other whereby the plural photosensitive drums are driven by the single drive motor (see, for example, JP-A-63-11967 (pages 3 to 4, FIG. 1), also referred to as "patent literature 1" hereinafter).

According to the technique described in the patent literature 1, compared to a case in which the respective photosensitive drums have drive sources individually, the registration of the respective color-component images is facilitated. However, mainly attributed to meshing having a backlash between the worm gear and the worm wheel, there has been found a technical drawback that the speeds of the photosensitive drums vary. In view of the above, there has been proposed, for example, a technique which provides a centering position constraining device for rotatably holding one ends of the worm shafts while centering one ends of the worm shafts and constraining both end positions of each worm shaft with respect to the axial direction whereby the image irregularities attributed to the speed variation of the photosensitive drums can be suppressed (see, for example, JP-A-2000-131918 (pages 4 to 5, FIG. 1), also referred to as "patent literature 2" hereinafter).

In this manner, by adopting the technique described in JP-A-2000-131918, it is possible to suppress the speed variation attributed to the oscillation variation and the axial oscillation of the worm shafts. However, the related art described in the patent literature 2 is not provided to suppress the speed variation caused by geometric factors such as the tooth shape accuracy, the pitch accuracy and the like of the worm gear as a single body. To maintain a certain rotation with high accuracy by suppressing the speed variation attributed to the geometric factors such as the tooth shape accuracy, the pitch accuracy or the like, it is necessary to manufacture the worm gears per se with high accuracy.

In manufacturing the general worm gear used in the tandem-type image forming apparatus, a metal material such as stainless steel is formed into a worm shape by cutting machining, rolling forming or the like and, thereafter, for ensuring the accuracy of the gear, a gear grinding step for grinding teeth of the gear is provided separately. Accordingly, to obtain the tooth shape having high accuracy, the manufacturing cost is eventually pushed up whereby there arises a drawback that a product cost is extremely pushed up.

SUMMARY OF THE INVENTION

The present invention has been made in view of the above circumstances and provides a tandem-type image forming apparatus which drives plural image carriers which are arranged in parallel using plural gears which are mounted on one rotary shaft and a single drive source, which alleviates an allowable accuracy level at the time of manufacturing gears by absorbing geometrical errors of the gears by the elastic deformation, a manufacturing method of a worm gear set in which the plural gears without using a gear grinding step is manufactured, for realizing the reduction of a manufacturing cost, and a drive mechanism which maintains highly the drive-system rigidity of a drive transmission system even when the geometric errors of the gears are absorbed by the elastic deformation.

Therefore, the present invention enables, in view of the characteristics of the tandem-type image forming apparatus that plural photosensitive drums (image carriers) are rotated synchronously with high accuracy, the smooth transmission of a driving force using worm gears made of a resin material and a connecting drive shaft made of metal material thus making use of the rigidity of the shaft and the elastic deformation of the gears. That is, the image forming apparatus to which the present invention is applied includes plural image carriers which are arranged in parallel, a common drive source which drives the plural image carriers, a drive shaft which is connected to and driven by the drive source, plural worm gears which are provided corresponding to the plural image carriers and are formed coaxially with the drive shaft, and plural worm wheels which are respectively meshed with the respective worm gears and respectively transmit drive forces of the worm gears to the image carriers, wherein the improvement is characterized in that the plural worm gears are made of a resin material, and the worm gears and the worm wheels drive the plural image carries by making use of the elastic deformation of the worm gears when the worm gears and the worm wheels are respectively meshed with each other.

On the other hand, a drive mechanism of an image forming apparatus to which the present invention is applied includes a metal shaft which is used as a drive shaft for simultaneously driving plural constitutional members in the image forming apparatus and plural worm gears made of a resin material which are formed over the metal shaft coaxially, transmit a driving force to respective shafts of the plural constitutional members, and are formed by insert molding after inserting the metal shaft in a mold, wherein the plural worm gears have helically threaded portions on outer peripheral portions of the resin material. Although the helically threaded portions are formed of the resin material, there is no problem in using other material such as a metal material, ceramic with respect to portions other than the helically threaded portions.

To grasp the present invention from other viewpoint, the drive mechanism of the image forming apparatus to which the present invention is applied includes a metal shaft which is used as a drive shaft for simultaneously driving plural constitutional members in the image forming apparatus, and plural worm gears which are coaxially mounted on the metal shaft and transmit a driving force to respective shafts of the plural constitutional members, the plural worm gears being made of a resin material which is sequentially pressfitted over the metal shaft, wherein the plural worm gears have helically threaded portions on an outer peripheral portion of the resin material. Here, there is no problem even when portions other than the helically threaded portions are formed of a material other than the resin material. Further, it does not matter whether the threaded portions are formed at a point of time of pressfitting the resin material.

To grasp the present invention from a viewpoint of a manufacturing method of a worm gear set to which the present invention is applied, the method comprises a step for inserting a metal shaft in a mold, a step for filling resin at plural positions which are spaced apart at a given distance in the axial direction of the metal shaft from a gate of the mold, and a step for coaxially forming plural worm gears on the metal shaft by solidifying the resin and removing the metal shaft and the solidified resin from the mold. Here, it is possible to adopt a feature that the step for forming the plural worm gears includes the formation of helically threaded portions by cutting the solidified resin. Further, the manufacturing method may be constituted such that the helical threads are formed at a point of time that the resin is solidified. Still further, according to another feature of the manufacturing method, in the step for filling the resin, the resin is filled until the resin embeds gate lands having large wall thickness portions and, thereafter, by way of film gates having small wall thickness portions and connected to the gate lands, the resin is filled into portions for forming the worm gears which cover the circumference of the metal shaft and are connected to the film gates.

On the other hand, to grasp the present invention from other point of view, the present invention is directed to a manufacturing method of a worm gear set for coaxially forming not smaller than three worm gears on a metal shaft, wherein the method comprises a step for cutting the metal shaft in which out of portions of the metal shaft where the worm gears are formed, a shaft diameter of the portions at a center side of the metal shaft is large and a shaft diameter of the portions at both end sides of the metal shaft is small, a step for sequentially pressfitting a resin-made preform over the cut metal shaft before or after forming helical threads.

According to the present invention, in the tandem-type image forming apparatus which drives the plural image carriers arranged in parallel using plural gears formed over one rotary shaft and the single drive source, it is possible to absorb the geometrical errors of gears by elastic deformation and hence, the allowable accuracy level at the time of manufacturing gears can be alleviated.

BRIEF DESCRIPTION OF THE DRAWINGS

Preferred embodiments of the present invention will be described in detail based on the following figures, wherein:

FIG. 4A to FIG. 4D are views for explaining structural examples when worm gears are mounted on a drive shaft by insert molding;

FIG. 5 is a view showing a structural example when the worm gear is assembled to the drive shaft by pressfitting the worm gear;

FIG. 8B is measured.

DESCRIPTION OF THE PREFERRED EMBODIMENTS

Embodiments of an image forming apparatus according to the present invention are explained in detail hereinafter in conjunction with attached drawings.

Figure 1:
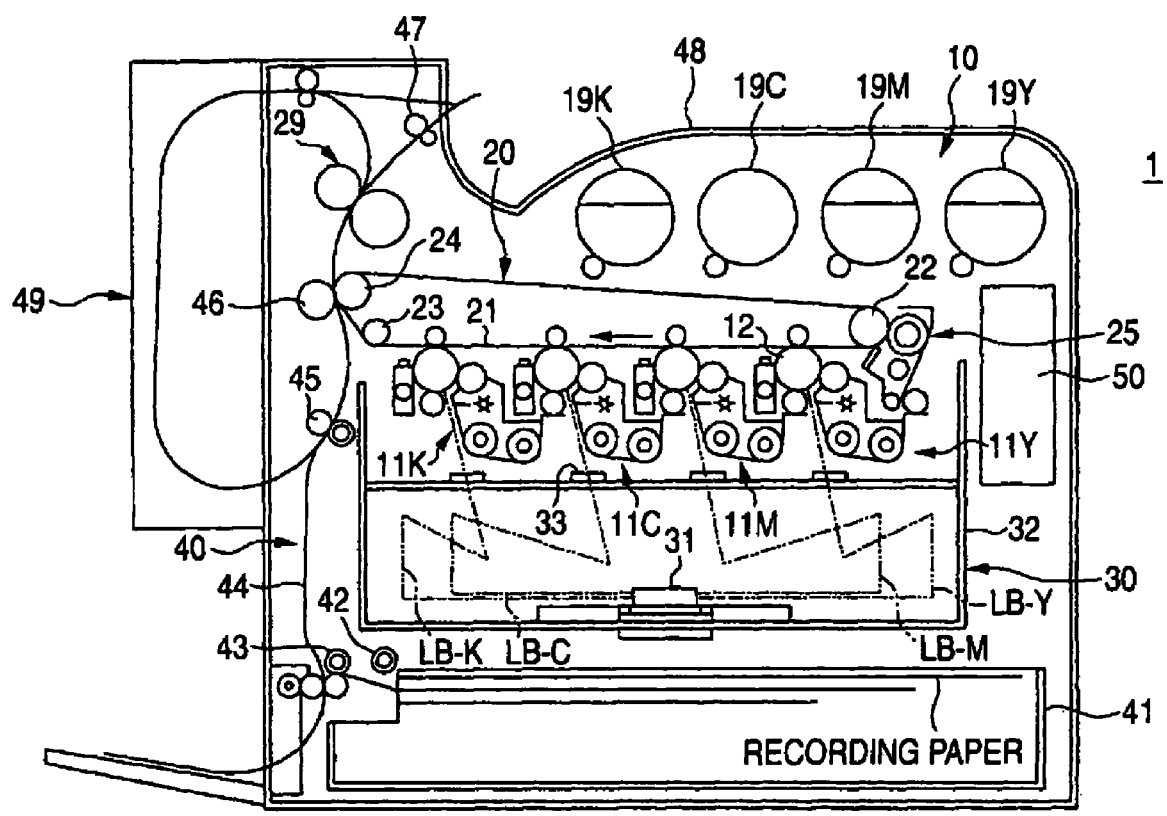
FIG. 1 is a view showing the whole constitution of an image forming apparatus according to an embodiment.

FIG. 1 is a view showing the whole structure of an image forming apparatus according to the present invention and shows a so-called tandem-type digital color printer. The image forming apparatus shown in FIG. 1 mounts an image processing system 10 which performs the image formation in response to gray scale data of respective colors, a paper transport system 40 which transports a recording paper, an OHP sheet or the like, and an IPS (Image Processing system) 50 which constitutes another image processing system connected to, for example, a personal computer, an image reader or the like and applying given image processing to the received image data on a body 1.

In the image processing system 10, four image forming units 11Y, 11M, 11C, 11K of yellow (Y), magenta (M), cyan (C) and black (K) are arranged in parallel in the horizontal direction at a fixed interval. Further, the image processing system 10 includes a transfer unit 20 which performs the multiple transfer of toner images of respective colors formed over photosensitive drums 12 of the image forming units 11Y, 11M, 11C, 11K to an intermediate transfer belt 21 and an ROS (Raster Output Scanner) 30 which constitutes an optical unit for irradiating laser beams to the image forming units 11Y, 11M, 11C, 11K. Further, on the body 1, a fixing unit 29 which fixes images which are secondarily transferred to a recording paper (sheet) by the transfer unit 20 to the recording paper using heat and pressure is formed. Still further, on the body 1, toner cartridges 19Y, 19M, 19C, 19K which supply toners of respective colors to the image forming units 11Y, 11M, 11C, 11K are formed.

The transfer unit 20 includes a drive roll 22 which drives the intermediate transfer belt 21, a tension roll 23 which imparts a fixed tension to the intermediate transfer belt 21, a back-up roll 24 for performing the secondary transfer of overlapped toner images of respective colors on the recording paper, and a cleaning device 25 for removing residual toners present on the intermediate transfer belt 21. The intermediate transfer belt 21 is extended between the drive roll 22 and the tension roll 23, the back-up roll 24 with a given tension. Further, the intermediate transfer belt 21 is driven in a circulating manner in an arrow direction by the drive roll 22 which is rotatably driven at a given speed by a dedicated drive motor (not show in the drawing) which exhibits the excellent constant speed characteristics. As the intermediate transfer belt 21, for example, a belt which is made of a belt material (rubber or resin) generating no charge-up and in which the resistance is adjusted is used. The cleaning device 25 includes a cleaning brush and a cleaning blade and is configured to make the intermediate transfer belt 21 prepare for a next image forming process by removing the residual toners, paper powders and the like from a surface of the intermediate transfer belt 21 after completion of the toner image transfer step.

The ROS 30 includes a polygon mirror 31 which performs the deflection scanning of laser beams (LB-Y, LB-M, LB-C, LB-K) irradiated from a semiconductor laser besides the semiconductor laser, a modulator and the like not shown in the drawing. In an example shown in FIG. 1, the ROS 30 is provided below the image forming units 11Y, 11M, 11C, 11K and has the possibility that the ROS 30 is smeared by a fall of toners or the like. Accordingly, the ROS 30 is provided with a rectilinear frame 32 for hermetically sealing the respective constitutional members. Further, the ROS is configured such that a glass-made window 33 which allows the laser beams (LB-Y, LB-M, LB-C, LB-K) to pass therethrough is provided above the frame 32 thus enhancing both of the scanning exposure and the shielding effect.

The paper transport system 40 includes a paper feeder 41 which stacks and feeds recording papers to which images are recorded, a nudger roll 42 for picking up and supplying the recording paper from the feeder 41, a feed roll 43 which separates the recording papers supplied from the nudger roll 42 one by one and transports the record papers, and a transport passage 44 which transports the recording papers which are separated one by one by the feed roll 43 to an image transfer part. Further, the paper transport system 40 also includes a resist roll 45 which transports the recording papers transported by way of the transport passage 44 toward a secondary transfer position at the timing of transporting the recording papers, and a secondary transfer roll 46 which performs the secondary transfer of the image on the recording paper by bringing the recording paper into pressure contact with the back-up roll 24 provided at a secondary transfer position. Further, the paper transport system 40 also includes a discharge roll 47 which discharges the recording paper to which the toner image is fixed by the fixing unit 29 to the outside of the body 1 and a discharge tray 48 which stacks the recording papers discharged by the discharge roll 47 thereon. Still further, the paper transport system 40 includes a both-face transport unit 49 which enables both-face printing by inverting the recording paper which is fixed by the fixing unit 29.

Next, the image forming units 11Y, 11M, 11C, 11K in the image processing system 10 are explained in detail.

Figure 2:
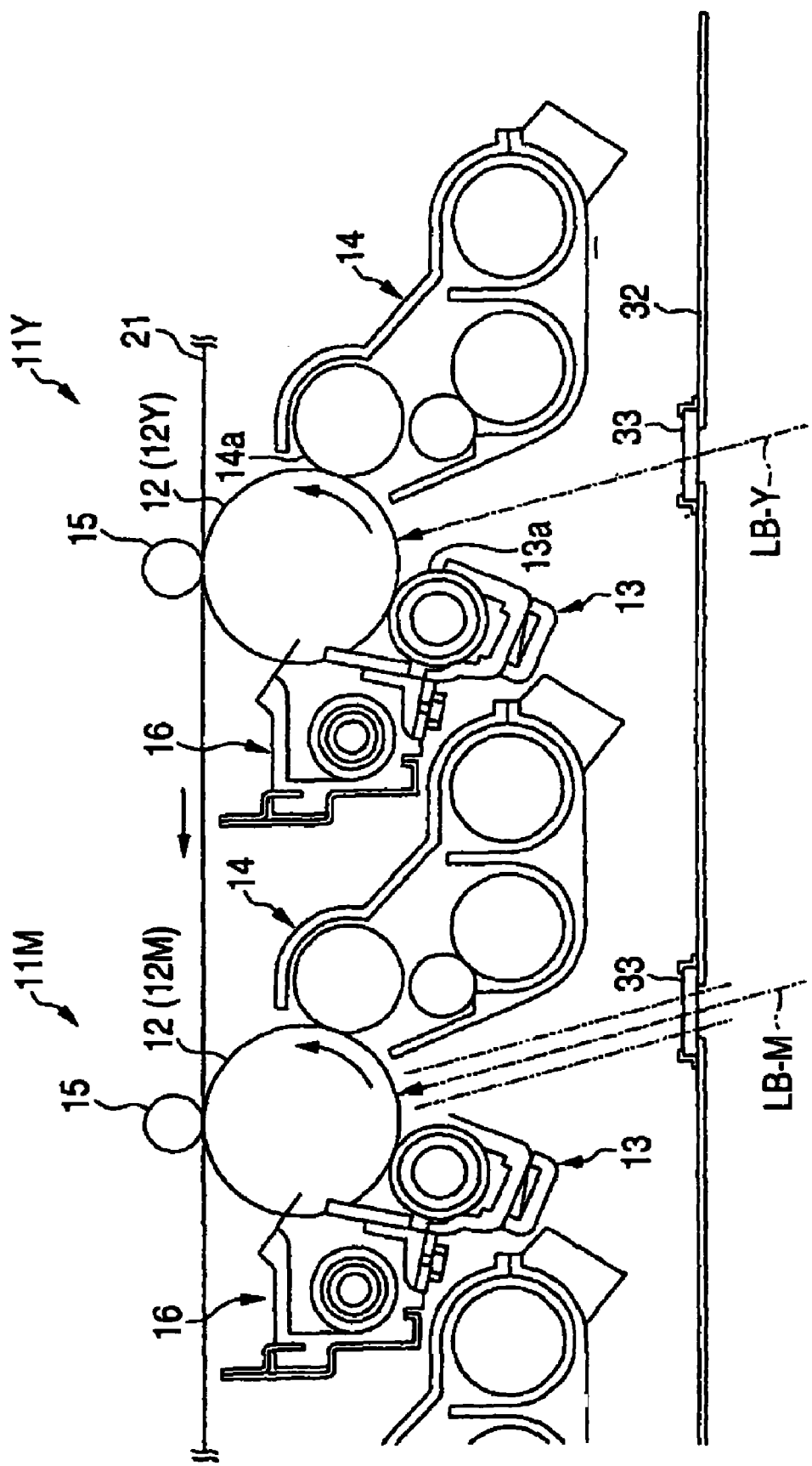
FIG. 2 is a view for explaining the constitution of an image forming unit.

FIG. 2 is a view for explaining the constitution of the image forming units 11Y, 11M, 11C, 11K in detail. In the drawing, the image forming unit 11Y for yellow (Y) and the image forming unit 11M for magenta (M) are shown. Other image forming units 11C, 11K also have the substantially same constitution.

Each image forming unit 11Y, 11M, 11C, 11K includes a photosensitive drum 12 as an image carrier for carrying a toner image, a charger 13 which charges the photosensitive drum 12 using a charge roll 13a, a developer 14 which is charged by the charger 13 and develops an electrostatic latent image formed over the photosensitive drum 12 using laser beams (LB-Y, LB-M, LB-C, LB-K) from the ROS 30 by a developing roll 14a, a primary transfer roll 15 which is arranged to face the photosensitive drum 12 in an opposed manner with the intermediate transfer belt 21 therebetween and transfers the toner image developed on the photosensitive drum 12 to the intermediate transfer belt 21, and a cleaning device 16 which removes residual toners remaining on the photosensitive drum 12 after the toner image transfer operation. Here, in this embodiment, in each image forming unit 11Y, 11M, 11C, 11K, the photosensitive drum 12, the charger 13 and the cleaning device 16 are integrally formed into a cartridge and four cartridges are mounted on the body 1. Further, only respective cartridges may be removed from the body 1 of the image forming apparatus or only respective cartridges may be mounted on the body 1.

Next, the manner of operation of the image forming apparatus shown in FIG. 1 is explained. A color material reflection optical image of an original which is read by an original reader not shown in the drawing or color material image data which is formed by a personal computer or the like not shown in the drawing is inputted to the IPS 50 as reflectance data of respective 8 bits of R (red), G (green), B (blue), for example. In the IPS 50, with respect to the inputted reflectance data, given image processings such as the shading correction, the positional displacement correction, the brightness/color space conversion, the gamma correction, the frame erasing, various image editing including the color editing and the movement editing are performed. The image data to which the image processing is applied is converted into color material gray scale data of four colors, that is, yellow (Y), magenta (M), cyan (C), black (K) and is outputted to the ROS 30.

In the ROS 30, in response to the inputted color material gray scale data, the laser beams (LB-Y, LB-M, LB-C, LB-K) emitted from the semiconductor laser (not shown in the drawing) are irradiated to a polygon mirror 31 by way of an f-θ lens (not shown in the drawing). In the polygon mirror 31, the incident laser beams are modulated corresponding to gray scale data of respective colors and are subjected to deflection scanning and are irradiated to the photosensitive drums 12 of the image forming units 11Y, 11M, 11C, 11K by way of a focusing lens and a plural mirrors not shown in the drawing. With respect to the photosensitive drums 12 of the image forming units 11Y, 11M, 11C, 11K, the charged surfaces are subjected to scanning exposure and hence, the electrostatic latent images are formed over the photosensitive drums 12. The formed latent images are developed as toner images of respective colors made of yellow (Y), magenta (M), cyan (C) and black (K) by the respective image forming units 11Y, 11M, 11C, 11K. The toner images formed over photosensitive drums 12 (12Y, 12M, 12C, 12K) of the image forming units 11Y, 11M, 11C, 11K are multiply transferred to the intermediate transfer belt 21 which constitutes an intermediate transfer body. Here, the black image forming unit 11K which forms the black toner image is arranged at the most downstream side in the moving direction of the intermediate transfer belt 21 and the black toner image is lastly subjected to the primary transfer with respect to the intermediate transfer belt 21.

On the other hand, in the paper transport system 40, the nudger roll 42 is rotated at the timing of the formation of the image so as to supply the recording paper of a given size from the paper feeder 41. The recording papers which are separated one by one are transported to the resist roll 45 by the feed roll 43 by way of the transport passage 44 and are temporarily stopped. Thereafter, at the moving timing of the intermediate transfer belt 21 on which the toner image is formed, the resist roll 45 is rotated and the recording papers are transported to the secondary transfer position which is defined by the back-up roll 24 and the secondary transfer roll 46. At the secondary transfer position, to the recording paper transported from below to above, the toner image formed by multiplying four colors is sequentially transferred in the sub-scanning direction using a pressure contact force and a given electric field. Then, the recording paper on which the toner images of respective colors are transferred receives the fixing treatment with heat and pressure by the fixing unit 29 and, thereafter, is discharged to the discharge tray 48 arranged above the body 1 by the discharge roll 47. Here, it may be possible that the recording paper is not directly discharged to the discharge tray 48 and the transport direction is changed over by a changeover gate not shown in the drawing and the recording paper which is fixed by the fixing unit 29 is inverted by the both face transport unit 49. The inverted recording paper is transported to the resist roll 45 and, thereafter, the image is formed over another surface on which printing is not performed in accordance with a flow similar to the above-mentioned flow whereby it is possible to form the images on both faces of the recording paper.

Next, the drive mechanism of the photosensitive drums 12 (12Y, 12M, 12C, 12K) is explained.

Figure 3:
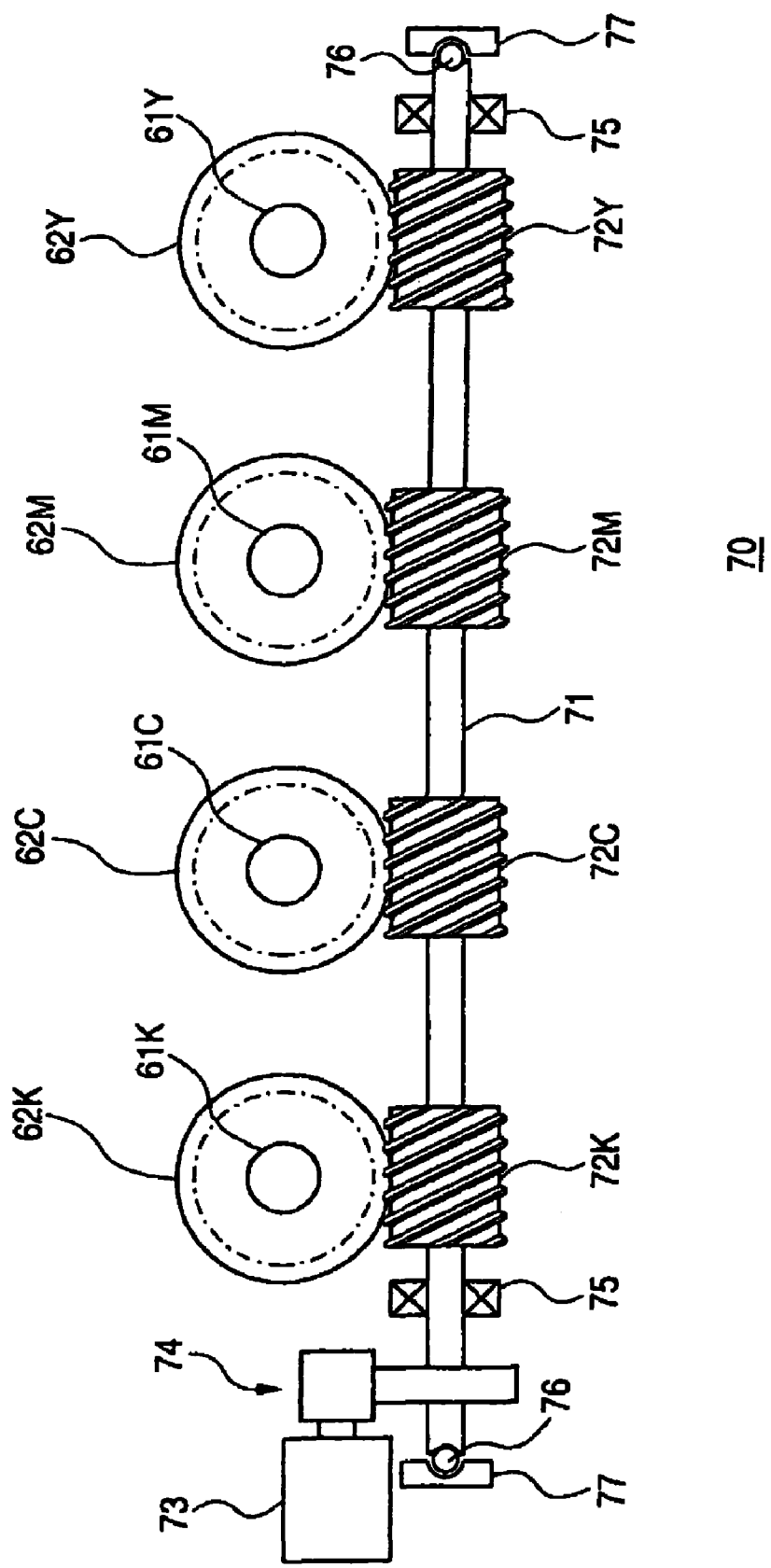
FIG. 3 is a view for explaining a photosensitive drum drive mechanism to which this embodiment is applicable.

FIG. 3 is a view for explaining a photosensitive drum drive mechanism 70 to which this embodiment is applied. In the tandem-type image forming apparatus, it is necessary to rotatably drive all of the photosensitive drums 12 (12Y, 12M, 12C, 12K) of the respective image forming units 11Y, 11M, 11C, 11K arranged in parallel at the same rotational speed. Accordingly, in this embodiment, drive shafts 71 of the respective photosensitive drums 12 (12Y, 12M, 12C, 12K) are integrated to provide the constitution in which the respective photosensitive drums 12 (12Y, 12M, 12C, 12K) are driven by a single drive source.

As shown in FIG. 3, the photosensitive drum drive mechanism 70 to which this embodiment is applied is formed over a back surface side of the body 1, wherein as a constitutional member thereof, a single drive shaft 71 which is formed of a metal material for ensuring rigidity is provided in the direction perpendicular to respective drum rotary shafts 61 (61Y, 61M, 61C, 61K) which become shafts at the time of rotating the respective photosensitive drums 12 (12Y, 12M, 12C, 12K). Four worm gears 72 (72Y, 72M, 72C, 72K) which are made of a resin material and have the helical threads are mounted on the drive shaft 71 at positions which face the respective photosensitive drums 12 (12Y, 12M, 12C, 12K). As the drive shaft 71 made of the metal material, for example, SUM (sulfur free cutting steel) or SUS (stainless steel) which is low-carbon steel is used. Further, with respect to the worm gears 72 (72Y, 72M, 72C, 72K), as the resin material, a thermoplastic resin is preferable. For example, the resin material may be polyacetal (POM), polybutylene terephthalate (PBT), super-engineering-plastic polyphenylene sulfide (PPS) or a composite material made of these materials. Worm wheels 62 (62Y, 62M, 62C, 62K) are mounted on respective drum rotary shafts 61 (61Y, 61M, 61C, 61K) of the respective photosensitive drums 12 (12Y, 12M, 12C, 12K) such that the worm wheels 62 (62Y, 62M, 62C, 62K) face the worm gears 72 (72Y, 72M, 72C, 72K) in an opposed manner. By making the respective worm gears 72 (72Y, 72M, 72C, 72K) and the respective worm wheels 62 (62Y, 62M, 62C, 62K) mesh with each other, it is possible to simultaneously rotate all drum rotary shafts 61 (61Y, 61M, 61C, 61K) by rotating the drive shaft 71.

Further, the photosensitive drum drive mechanism 70 includes a drive motor 73 which constitutes a common drive source (a single drive source) for driving the respective photosensitive drums 12 (12Y, 12M, 12C, 12K), a gear box 74 which is drivably connected to the drive motor 73 and transmits a driving force from the drive motor 73 to the drive shaft 71, and bearings 75 which support the drive shaft 71 at least at two points. Further, a spherical body 76 which holds the drive shaft 71 in a state that the rotational irregularities of the drive shaft 71 are suppressed and a spherical body receiving plate 77 which is fixed to a frame (not shown in the drawing) of the body 1 or the like in a state that a fall of the spherical body 76 is stopped are provided to both ends of the drive shaft 71.

Here, when the drive motor 73 is driven, the drive shaft 71 which is supported on the bearing 75 is rotated by way of the gear box 74. Due to such a rotation of the drive shaft 71, four resin-made worm gears 72 ((72Y, 72M, 72C, 72K) which are fixed to the drive shaft 71 are simultaneously rotated in the same direction. Due to the rotation of these four worm gears 72 (72Y, 72M, 72C, 72K), the helical threads are rotated and hence, the worm wheels 62 (62Y, 62M, 62C, 62K) which are mounted on the drum rotary shafts 61 (61Y, 61M, 61C, 61K) of four photosensitive drums 12 (12Y, 12M, 12C, 12K) are rotated in the direction perpendicular to the axial direction of the drive shaft 71 simultaneously and in the same direction. Since the worm gears 72 (72Y, 72M, 72C, 72K) are made of the resin material, when the worm gears 72 (72Y, 72M, 72C, 72K) are meshed with the worm wheels 62 (62Y, 62M, 62C, 62K) so as to rotate four photosensitive drums 12 (12Y, 12M, 12C, 12K), the worm gears 72 (72Y, 72M, 72C, 72K) are resiliently or elastically deformed. In an attempt to rotate four photosensitive drums 12 (12Y, 12M, 12C, 12K) with high accuracy, with respect to conventional worm gears 72 (72Y, 72M, 72C, 72K) made of a metal material, it is necessary to make the accuracy of a tooth shape, a tooth trace, a pitch and the like extremely high with respect to the helical threads. Accordingly, by spending a lot of expense for forming gears including the sufficient tooth grinding, a motion quality necessary for rotation of four photosensitive drums 12 (12Y, 12M, 12C, 12K) is ensured. However, according to this embodiment, by using the resin material as the material of the worm gears 72 (72Y, 72M, 72C, 72K) which are meshed with the worm wheels 62 (62Y, 62M, 62C, 62K), it is possible to absorb the geometrical errors due to the elastic deformation. As a result, even with respect to the peculiar operation mode that the plural photosensitive drums 12 (12Y, 12M, 12C, 12K) are simultaneously rotated, with the use of the worm gears 72 (72Y, 72M, 72C, 72K) of this embodiment, even when the accuracy of the gears is lowered thus remarkably decreasing the cost for forming gears, it is possible to maintain the motion quality.

Here, the photosensitive drum drive mechanism 70 is configured to rotate the photosensitive drums 12 (12Y, 12M, 12C, 12K) using the combination of the worm gears 72 (72Y, 72M, 72C, 72K) having the helical threads and the worm wheels 62 (62Y, 62M, 62C, 62K). However, when members which are brought into contact with the photosensitive drums 12 (12Y, 12M, 12C, 12K) are rotated together with the photosensitive drums 12 (12Y, 12M, 12C, 12K), the photosensitive drum drive mechanism 70 also functions as a drive unit of these members. For example, in the structure shown in FIG. 1, the photosensitive drum drive mechanism 70 may function as the drive unit of the intermediate transfer belt 21 which constitutes the intermediate transfer body. Further, in an image forming apparatus which directly transports the recording paper, the photosensitive drum drive mechanism 70 may also function as drive unit of a carrier for recording papers.

Next, the structure of the drive shaft 71 and the worm gears 72 (72Y, 72M, 72C, 72K) is explained.

FIG. 4A to FIG. 4D are views showing the constitutional examples in which the worm gears 72 (72Y, 72M, 72C, 72K) are fixed to the drive shaft 71 by insert molding (described later). Here, in respective drawings, only one worm gear 72 is shown and the worm gear 72 is shown in a cross section to facilitate the understanding of the drawing.

In FIG. 4A, a D cut 71a is formed in the drive shaft 71 formed of a rod having a circular cross section at a portion thereof where the worm gear 72 is formed by molding. Due to the provision of the D cut 71a, there is no possibility that the worm gear 72 which is formed by molding rotates freely about the drive shaft 71 and the worm gear 72 can be rotated in an interlocking manner with the rotation of the drive shaft 71. According to the structure shown in FIG. 4A, the accuracy in a tooth shape can be easily achieved, the eccentricity can be reduced, and the structure can be manufactured with a low forming cost thus bringing about an advantageous effect with respect to the cost.

In FIG. 4B, on a surface of the drive shaft 71 formed of a rod having a circular cross section, a knurling 71b is formed at a portion thereof where the worm gear 72 is formed. Due to the formation of such a knurling 71b, in the same manner as the D cut 71a shown in FIG. 4A, it is possible to suppress idling of the worm gear 72 about the drive shaft 71 and also to exhibit an advantageous effect with respect to the cost.

The constitutional example shown in FIG. 4C is characterized by a point that the drive shaft 71 is formed of a cylindrical tube having a circular cross section which constitutes a hollow cylindrical body. Although the structure may achieve the accuracy of a tooth shape and the reduction of eccentricity at a satisfying level, the structure is expected to push up the cost slightly. By forming a D cut 71a or a knurling 71b similar to those shown in FIG. 4A or FIG. 4B to a surface of the hollow cylindrical tube, it is possible to prevent idling of the worm gear 72 about the drive shaft 71.

The constitutional example shown in FIG. 4D is characterized by a point that a polygonal-rod shaft having a polygonal cross section such as a commercially available metal hexagonal shaft or the like is used as the drive shaft 71. With the use of such a polygonal-rod shaft, it is possible to prevent idling in the rotational direction of the worm gear 72 formed over the drive shaft 71 by insert molding. However, with the mere use of the polygon-rod shaft, there exists a possibility that the worm gear 72 is moved in the axial direction of the drive shaft 71. Accordingly, it is preferable to form a given groove 71c shown in FIG. 4D at a portion of the drive shaft 71 where the worm gear 72 is formed. However, when the polygonal-rod shaft is used, it is necessary to design the structure or the like of the bearing 75 shown in FIG. 3.

FIG. 5 shows a structural example which is assembled by pressfitting the warm gears 72 (72Y, 72M, 72C, 72K) over the drive shaft 71. Here, the worm gears 72 (72Y, 72M, 72C, 72K) are expressed in the cross-sectional structure. In the photosensitive drum drive mechanism 70 to which this embodiment is applied, four worm gears 72 (72Y, 72M, 72C, 72K) are connected to one drive shaft 71. Accordingly, in pressfitting the molded gears (before tooth cutting or after tooth shape forming) over the drive shaft 71, to mount two worm gears 72 (72M and 72C) at a center portion of the drive shaft 71, it is necessary to make these worm gears 72 (72M and 72C) pass over portions located at ends of the drive shaft 71 where two worm gears 72 (72Y and 72K) are to be mounted. In mounting the worm gears 72 on the drive shaft 71, to prevent idling of the worm gears 72 relative to the drive shaft 71, it is necessary to fix the worm gears 72 to the drive shaft 71 with a relatively strong pressure or, for example, to form the given projections 71d or the like which extends in the axial direction on the drive shaft 71. Approximately 0.1 to 0.2 mm is sufficient as the size of the projection. Assuming that an inner diameter of two worm gears 72 (72M and 72C) at the center portion of the drive shaft 71 and an inner diameter of two worm gears 72 (72Y and 72K) at the ends of the drive shaft 71 are equal, there arises a possibility that two worm gears 72 (72M and 72C) at the center portion of the drive shaft 71 cannot easily pass over the portions located at ends of the drive shaft 71 where two worm gears 72 (72Y and 72K) are to be mounted. There also exists a possibility that when these two worm gears 72 (72M and 72C) pass over the portions located at ends of the drive shaft 71, the inner diameter of the resin-made worm gears 72 (72M and 72C) is deformed and hence, when the worm gears 72 (72M and 72C) are mounted at the designated positions, they cannot obtain the sufficient mounting strength. When the number of worm gears 72 is three or more, a similar problem arises.

Accordingly, in this embodiment, for example, when the shaft diameter of the drive shaft 71 is set to 12 mm, the shaft diameter of the drive shaft 71 at portions (positions) where two worm gears 72 (72M and 72C) at the center portion are mounted is designed to be slightly larger (for example, a diameter of 12.5 mm) than the shaft diameter at end portions. Corresponding to such shaft diameters, two worm gears 72 (72M and 72C) at the center portion and two worm gears 72 (72Y and 72K) at the end portions are designed to differ in the inner diameter. Here, the worm gear 72M for magenta and the worm gear 72Y for yellow are mounted on the drive shaft 71 by sliding them over the drive shaft 71 in the X1 direction shown in FIG. 5. In this case, since the inner diameter of the magenta worm gear 72M is larger than the outer diameter of the portion of the drive shaft 71 for mounting the worm gear 72Y, in moving the worm gear 72M to the portion where the worm gear 72K is to be mounted, such a portion does not become an obstacle whereby the occurrence of deformation, shaving or the like of the inner diameter portion of the worm gear 72M can be prevented. In the same manner, although the worm gear 72C for cyan and the worm gear 72K for black are mounted on the drive shaft 71 by sliding them over the drive shaft 71 in the X2 direction shown in FIG. 5, since the inner diameter of the worm gear 72C is larger than the outer diameter of the portion of the drive shaft 71 for mounting the worm gear 72K, in making the worm gear 72C pass over the mounting portion for the black worm gear 72K, such a portion does not become an obstacle whereby the occurrence of deformation, shaving or the like of the inner diameter portion of the worm gear 72C can be prevented. When the number of worm gears 72 used is three, a shaft diameter of a portion where the center worm gear 72 is mounted becomes larger than a shaft diameter of portions where the end worm gears 72 are mounted.

In the example shown in FIG. 5, when the worm gears 72 (72Y, 72M, 72C, 72K) are mounted on the drive shaft 71, due to E rings 78 which constitute mechanical fastening members, both ends of each worm gear 72 (72Y, 72M, 72C, 72K)

are fixed. Accordingly, when the worm gears 72 (72Y, 72M, 72C, 72K) are fitted over in the axial direction, the displacement of the respective worm gears 72 (72Y, 72M, 72C, 72K) in the axial direction of the drive shaft 71 can be suppressed. Here, as the fastening treatment, fastening using an adhesive agent or the like can be considered besides the mechanical fastening. Further, in fitting the worm gears 72 (72Y, 72M, 72C, 72K) over the drive shaft 71, whether a tooth shape is formed in the respective worm gears 72 (72Y, 72M, 72C, 72K) or not does not matter. It is possible to assemble the resin preform to which the tooth shape is not formed to the drive shaft 71 by pressfitting and, thereafter, to form the tooth shape in the worm gears 72 by cutting. It is also possible to assemble the formed worm gears in which the tooth shape is already formed to the drive shaft 71 so as to provide the constitution shown in FIG. 5.

Next, the method for forming the worm gears 72 (72Y, 72M, 72C, 72K) on the drive shaft 71, that is, the manufacturing method of a tandem-use worm gear set in this embodiment is explained.

The first manufacturing method is a manufacturing method using insert molding in which a fluid resin is solidified at positions of the drives shaft 71 made of a metal shaft where the worm gears 72 are mounted thus forming the worm gears 72. The second manufacturing method is a pressfitting fixing manufacturing method in which a previously-solidified resin is fixed to the drive shaft 71 by pressfitting. These manufacturing methods are explained in order.

Figure 6A:
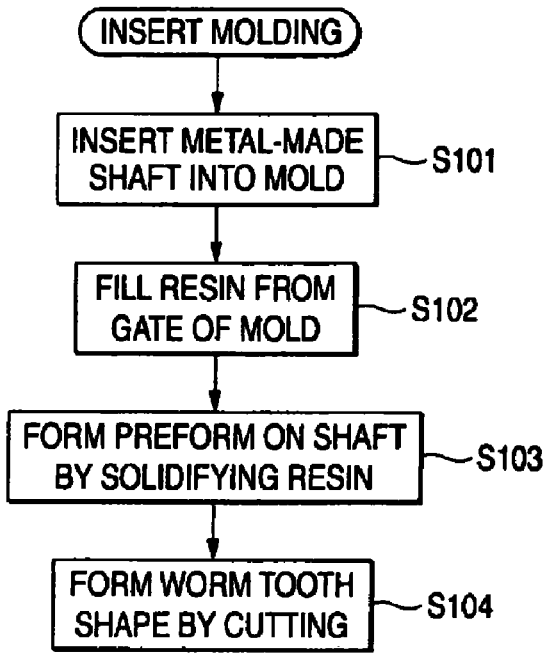
FIG. 6A and FIG. 6B are views showing a manufacturing step of a worm gear set for tandem-use by insert molding of the first manufacturing method and an example of a mold used for insert molding.
Figure 6B:
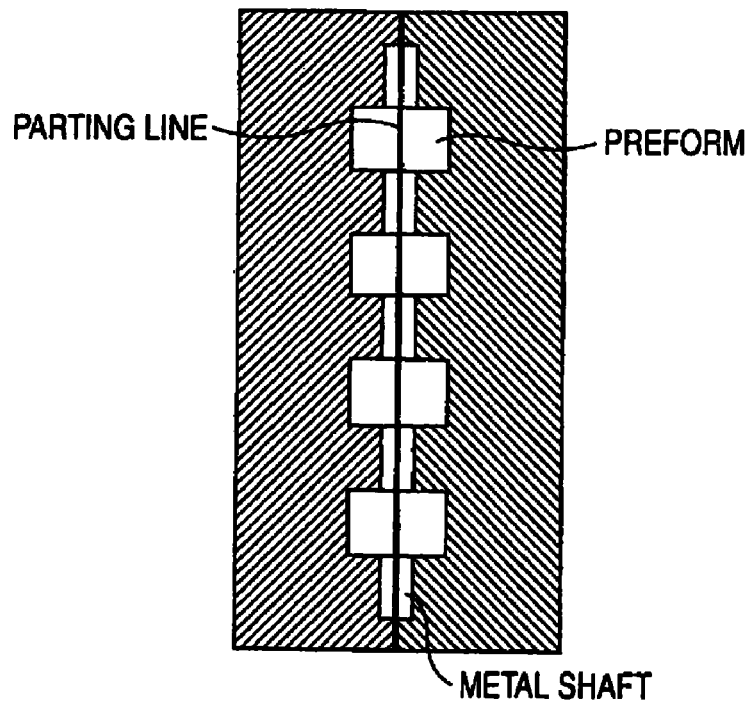

FIG. 6A and FIG. 6B illustrate manufacturing steps of the tandem-use worm gear set formed by insert molding of the first manufacturing method and an example of a mold used in the insert molding. As shown in FIG. 6A, first of all, in performing the insert molding, a metal-made shaft (metal shaft) which constitutes the drive shaft 71 is inserted into a mold shown in FIG. 6B (step 101). In the next step, in preform forming portions shown in FIG. 6B, resin is filled through a gate of the mold (step 102). Subsequently, the resin is solidified to form preforms on the metal shaft (step 103). Thereafter, the mold is opened from a parting line and a molded product is taken out from the mold. Then, both end portions of the metal shaft on which the preforms are formed are supported and a worm tooth shape (helical threads) are formed in the formed preforms by cutting or the like thus forming the respective worm gears 72 (72Y, 72M, 72C, 72K) (step 104).

Here, in the step shown in FIG. 6A, although the final tooth shape of the respective worm gears 72 (72Y, 72M, 72C, 72K) is formed by the cutting step, the final tooth shape (helical threads) may be formed by molding using a mold. However, when the worm tooth shape is formed using the mold, to take out a molded product from the mold, it is necessary to take out the molded product while rotating gear portions. Accordingly, a simple upper-and-lower (left-and-right) mold cannot be used and a given split mold which can take out a molded product from a mold by rotating respective worm gears 72 (72Y, 72M, 72C, 72K) portions is required.

Figure 7:
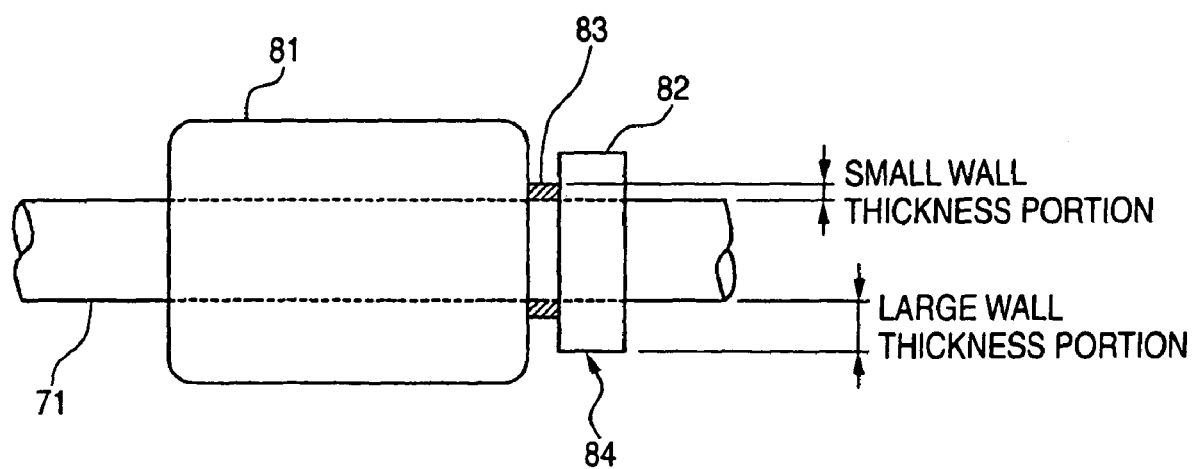
FIG. 7 is a view showing one example of a molded product (preform) produced by a step shown in FIG. 6A.

FIG. 7 illustrates one example of the molded product (preform) which is formed by the step shown in FIG. 6A. Here, the molded product corresponding to one worm gear 72 is taken as an example. As has been explained in conjunction with FIG. 6, in this embodiment, the preform is formed around the metal shaft and hence, a cavity is formed in a portion of the molded product corresponding to the metal shaft. Accordingly, when the preform is formed by making the resin flow into the mold as it is without taking any countermeasure, two or more flow fronts (flow distal end portions) are generated thus giving rise to weld lines which are threadlike fine linear traces (fluid lines) at a portion where the flow fronts merge. The presence of the weld lines is liable to easily generate cracks at such a portion and hence, the molded product is not preferable as a gear for transmitting the driving of the photosensitive drums 12 (12Y, 12M, 12C, 12K). Accordingly, in this embodiment, as the shape of the preform of each worm gear 72 (72Y, 72M, 72C, 72K) a shape shown in FIG. 7 is adopted.

In FIG. 7, around the drive shaft 71 which is formed of the metal shaft, a preform forming portion 81 where the tooth shape of the worm gear 72 is formed, a gate land 82 in which a gate position 84 for allowing the inflow of the resin is formed, and a film gate 83 which is connected to the preform forming portion 81 and the gate land 82 and has a small wall thickness portion along a shaft outer diameter of the drive shaft 71 are formed. The resin which is made to flow into the mold has a property to flow into a portion where the wall thickness is large. By making use of this property, the gate land 82 provided with the gate position 84 is formed as a large wall thickness portion having a thickness of approximately 2 mm, for example, around the shaft. On the other hand, the film gate 83 which is connected to the gate land 82 has a small wall thickness portion having a thickness of approximately 0.3 mm around the shaft thus narrowing a flow passage of the resin toward the preform forming portion 81. The resin which is made to flow into the gate land from the gate position 84 is, first of all, made to flow into the gate land 82 which constitutes the large wall thickness portion such that the resin embeds the gate land 82. After completion of inflow into the large wall thickness portion, in a pressurized state, the resin moves in the small wall thickness portion of the film gate 83 along the shaft and enters the preform forming portion 81. In this manner, according to this embodiment, by adopting the structure shown FIG. 7, after the gate land 82 having the large wall thickness portion is embedded with the resin, in a state that the resin is squeezed by the film gate 83 having the small wall thickness portion, the resin is filled into the perform forming portion 81 along the shaft while covering the circumference of the shaft with the resin. When the resin directly flows into the preform forming portion 81 having a large wall thickness from the gate position 84, the resin is filled into the preform forming portion 81 arbitrarily from a wide range and hence, the weld lines are liable to be easily generated. However, according to this embodiment, it is possible to suppress the generation of weld lines whereby drawbacks caused by the occurrence of cracks can be largely reduced.

Here, portions such as the film gate 83 and the gate land 82 are no more necessary after the formation of the preform forming portion 81 and hence, these portions may be removed. However, when these portions do not obstruct the driving of the worm gear 72, it is preferable to leave these portions as it is from a viewpoint of reducing a removal step.

In this manner, according to the first manufacturing method, the metal-made shaft (rod shaft having a circular cross section) is inserted into the inside of the mold having a given shape and the resin is filled into the mold thus forming the approximately cylindrical preforms around the shaft. Then, while supporting both ends of the shaft, tooth forming by cutting is applied to the preform portions made of resin so as to form the worm gear shape.

Next, the pressfitting fixing manufacturing method which is the second manufacturing method is explained. According to this pressfitting fixing manufacturing method, the tandem-use worm gear set having the above-mentioned structure shown in FIG. 5 is formed.

In this pressfitting fixing manufacturing method, first of all, it is necessary to form a cylindrical member (resin-made preform) which becomes a proto type of respective worm gears 72 (72Y, 72M, 72C, 72K). As a method for forming the cylindrical members, various methods including following methods are considered.

1. A method which cuts a resin rod having a circular cross section.
2. An extrusion molding method which forms a continuous cylindrical member by molding and cuts the cylindrical member into a desired size.
3. Injection molding which manufactures the tandem-use worm gear set using general plastic molding in which each cylindrical members is formed by filling resin into a mold and solidifying the resin thereafter.

With respect to the injection molding described in the above-mentioned paragraph 3, to eliminate "shrinkage crack" and "voids (bubbles)" which are defects generated in the large wall thickness molding, it is effective to adopt the injection compression molding. This injection compression molding adopts a method in which a compression pin disposed in the inside of a mold is advanced before the resin is solidified thus compressing the resin in the inside of a cavity.

After forming the cylindrical members using the above-mentioned various methods, in the next step, the cylindrical members are assembled to the metal shaft as shown in FIG. 5. As described above, the cylindrical members which are used for forming the magenta worm gear 72M and the yellow worm gear 72Y are made to slide in the X1 direction shown in FIG. 5 and are sequentially mounted on the drive shaft 71 formed of the metal shaft. Further, the cylindrical members which are used for forming the cyan worm gear 72C and the black worm gear 72K are made to slide in the X2 direction shown in FIG. 5 and are sequentially mounted on the drive shaft 71. After mounting the cylindrical members in this manner, as the fastening treatment, for example, the E rings 78 which constitute mechanical fastening members are mounted on the drive shaft 71. Here, it is also effective to perform the fastening treatment using an adhesive agent or the like. In mounting the cylindrical members on the drive shaft 71, when the worm tooth shape is formed in the cylindrical members, the manufacture of the tandem-use worm gear set is completed with such a step. On the other hand, in mounting the cylindrical members on the drive shaft 71, when the worm tooth shape is not formed in the cylindrical members, a series of manufacturing steps are completed by forming the worm tooth shape in the cylindrical members by cutting or the like.

In this manner, according to the second manufacturing method, first of all, for example, the resin is filled in the inside of the mold having a desired shape and the resin is solidified so that the preforms having a cylindrical shape (cylindrical members) are formed by injection molding (or injection compression molding). Alternatively, the continuous cylindrical resin material (elongated resin material) is formed by extrusion molding and the resin material is cut into a given length thus forming the preforms (cylindrical members). The preforms formed in this manner are pressfitted over and fixed to the metal shaft at desired positions. Thereafter, both end portions of the metal shaft are supported and the worm tooth shape (helical threads) is formed in the preform portions of the resin by tooth forming using cutting. Further, it is possible to use mechanical fastening unit such as the E lings 78 or the like for pressfitting and fixing the preforms to the metal shaft.

With the use of the manufacturing method which has been explained in detail in conjunction with the first manufacturing method and the second manufacturing method, according to this embodiment, the formation of the worm gears 72 (72Y, 72M, 72C, 72K) having the multiple series structure using the resin material which has been difficult with the prior art can be realized. In forming the worm tooth shape having the helical threads using a mold, as described above, it is necessary to draw the solidified resin while rotating the solidified resin. When only one worm gear 72 is used, the worm gear can be relatively easily formed by molding (for example, JP-A-8-90667). However, when the plural resin-made worm gears 72, (72Y, 72M, 72C, 72K) are connected to the metal-made shaft, the formation of such a structure with high accuracy is extremely difficult and hence, it has been difficult with the prior art. In this embodiment, such a drawback can be overcome with the above-mentioned manufacturing method thus realizing the acquisition of the resin-made tandem-use worm gear set.

Next, advantageous effects obtained when the worm gears 72, (72Y, 72M, 72C, 72K) made of the resin material which are formed in the above-mentioned manner are adopted are explained.

Figure 8A:
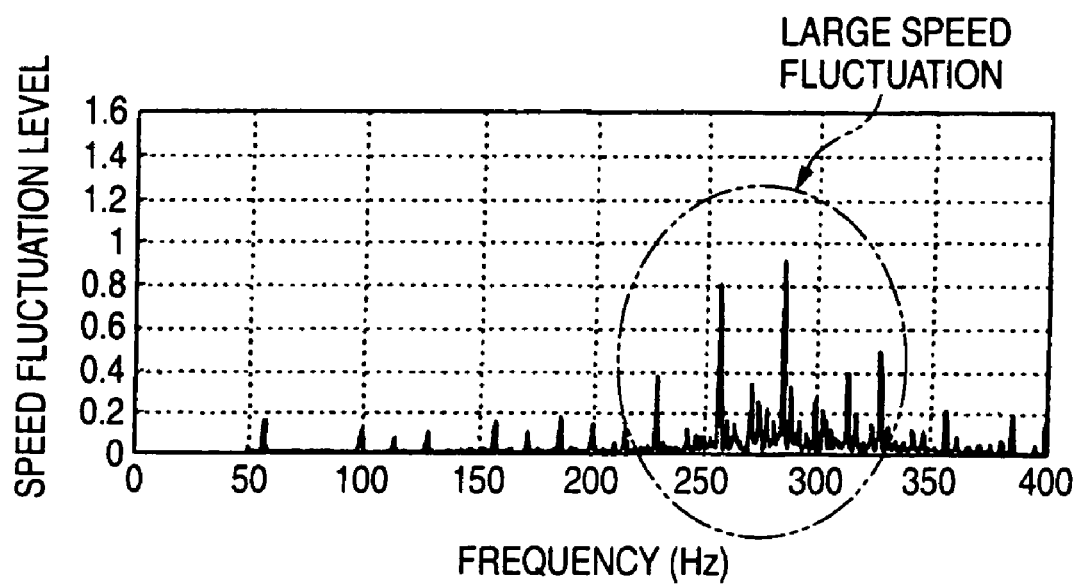
FIG. 8A and FIG. 8B are views for explaining advantageous effects obtained by adopting the drive mechanism of this embodiment.
Figure 8B:
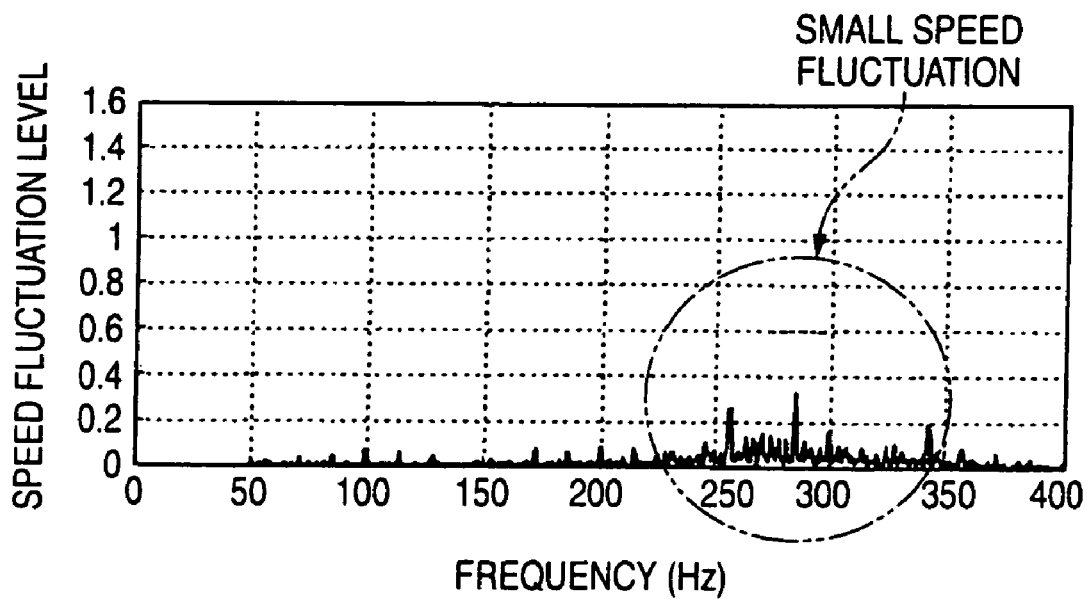

FIG. 8A and FIG. 8B are views for explaining advantageous effects obtained when the drive mechanism of this embodiment is adopted. FIG. 8A indicates a speed fluctuation level when the conventional metal worm is adopted, while FIG. 8B indicates a speed fluctuation level when the resin worm of this embodiment is adopted. In respective drawings, frequency is taken on an axis of abscissas and an absolute value of the speed fluctuation level is taken on an axis of ordinate. In the conventional metal worm shown in FIG. 8A, it is understood that the speed fluctuation is extremely large in the vicinity of 275 Hz, for example, which is a resonance point of the worm drive system. On the other hand, with respect to the resin worm of this embodiment shown in FIG. 8B, it is understood that the peek level is largely lowered and the speed fluctuation is extremely small in the vicinity of 275 Hz which is the resonance point of the worm drive system.

Figure 9A:
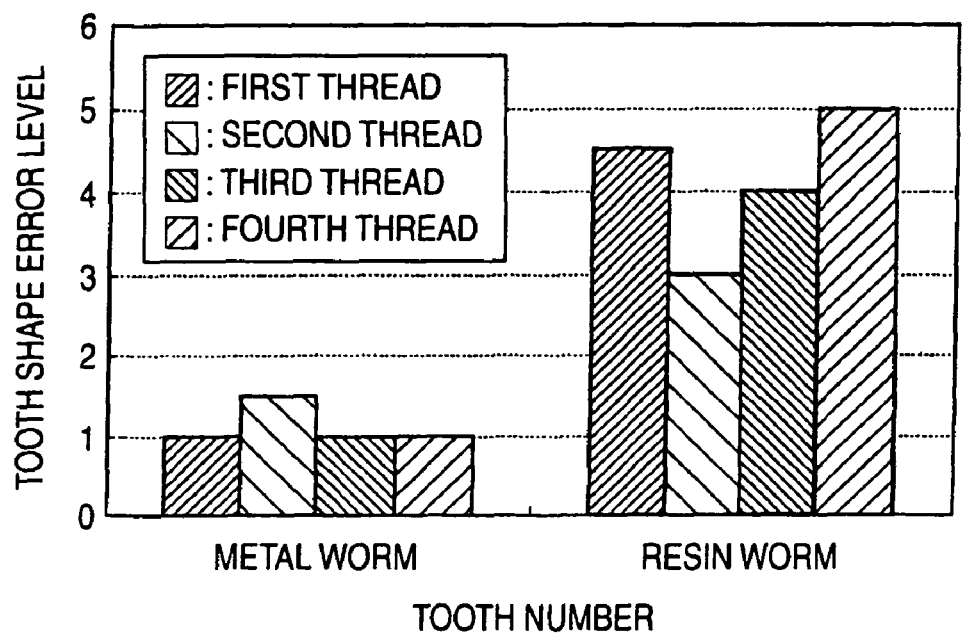
FIG. 9A and FIG. 9B are views showing the data on accuracy of worm gears when the speed fluctuation level shown in FIG. 8A
Figure 9B:
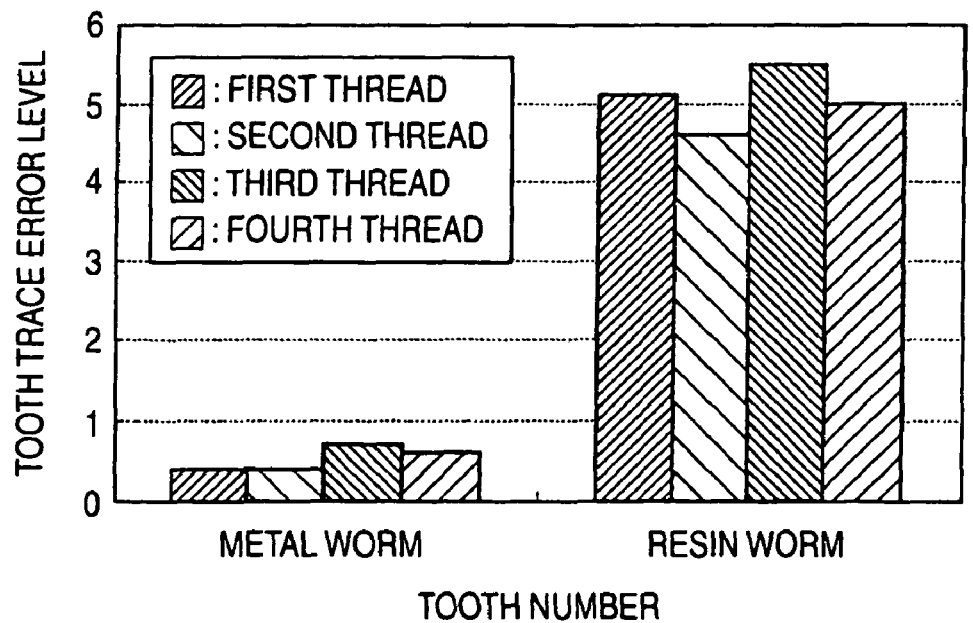

FIG. 9A and FIG. 9B indicate accuracy data of the worm gears 72 which are served for measuring the speed fluctuation level shown in FIG. 8A and FIG. 8B. FIG. 9A indicates an amount of error in the tooth shape with respect to a theoretical involute tooth shape. That is, FIG. 9A indicates the tooth shape error level of the metal worm which exhibits the experimental result shown in FIG. 8A and the tooth shape error level of the resin worm which exhibits the experimental result shown in FIG. 8B. Each worm gear 72 has 4-thread helicals and respective tooth shape error levels at a first thread to a fourth thread are indicated. Further, FIG. 9B indicates respective tooth trace error levels at the first to fourth threads in the metal worm which exhibits the experimental result shown in FIG. 8A and the resin worm which exhibits the experimental result shown in FIG. 8B.

As shown in FIG. 9A, the tooth shape error level of the resin worm is approximately 2 to 5 times as large as the tooth shape error level of the metal worm. Further, as shown in FIG. 9B, the tooth trace error level of the resin worm is approximately 10 times as large as the tooth trace error level of the metal worm. In this manner, compared to the conventional metal worm, the accuracy of the manufactured worm of this embodiment is largely lowered and worsened. However, it is understood from FIG. 8A and FIG. 8B, the speed fluctuation level is largely lowered. That is, according to this embodiment, it is understood that even when the accuracy of forming or machining is not so high, the high rotation quality can be obtained. With respect to the resin worm of this embodiment, a shaft portion of the drive shaft 71 is formed of metal. Accordingly, it is possible to ensure the advantageous effect that the drive-system rigidity of the worm gear drive transmission system is high (the resonance point is high) in the same manner as the prior art.

As has been explained in detail heretofore, according to this embodiment, in the tandem-type color image forming apparatus, to drive the plural photosensitive drums 12 (12Y, 12M, 12C, 12K), worm gears 72 (72Y, 72M, 72C, 72K) made of the resin material are mounted on the drive shaft 71 made of the metal shaft. With respect to the metal worm gear, the worm per se has high rigidity and hence, the geometric errors in the gear tooth shape, the gear trace accuracy, the pitch accuracy or the like directly impart influences to the speed fluctuation of the photosensitive drums 12 (12Y, 12M, 12C, 12K). However, in this embodiment, with the use of the worm gears 72 (72Y, 72M, 72C, 72K) made of the resin material, the worm gears 72 can easily generate the elastic deformation and the geometric errors of the gears can be absorbed by the elastic deformation. As a result, the allowance level of the manufacturing accuracy can be alleviated. The alleviation of the allowable level of the manufacturing accuracy may be realized by omitting the gear grinding step, for example. Accordingly, the reduction of the manufacturing cost can be realized. Further, as mentioned previously, the advantageous effects that the worm gear drive transmission system has high drive-system rigidity (high resonance point) can be ensured by forming the shaft portion with metal.

As examples to which the present invention is applicable, an image forming apparatus such as a color printer or a copier, a facsimile and the like which adopt the electrophotographic method and drive mechanism which are used in these image forming apparatuses are named.

Further, the preferred embodiments of the present invention are described below.

(1) In the image forming apparatus of the present invention, the drive shaft is made of a metal material.

(2) In the image forming apparatus of the present invention, the plural worm gears are fixed to the drive shaft by forming resin on the drive shaft by molding.

(3) In the image forming apparatus of the present invention, the plural worm gears are formed by molding such that each preform forming portion where a tooth shape of the worm gear is formed, each gate land having a large wall thickness portion at the time of injecting resin and each film gate having a small wall thickness portion for allowing inflow of resin into each preform forming portion in a squeezed manner are connected.

(4) In the image forming apparatus of the present invention, the plural worm gears are fixed to the drive shaft by pressfitting molded resin over the drive shaft.

(5) In the image forming apparatus of the present invention, the drive shaft differs in a diameter thereof corresponding to positions where the plural worm gears are pressfitted.

(6) In the drive mechanism of an image forming apparatus of the present invention, the plural worm gears are formed by molding, each worm gear including:
   a preform portion on which the threaded portion is formed;
   a gate land which has a gate position for injecting resin; and
   a film gate which is formed between the gate land and the preform forming portion while having a thickness smaller than a thickness of the gate land and allows the injected resin to flow into the preform forming portion.

(7) In the drive mechanism of an image forming apparatus of the present invention, in the plural worm gears, the threaded portion is formed by performing cutting machining after insert molding or by performing insert molding directly.

(8) In the drive mechanism of an image forming apparatus of the present invention, the idling prevention treatment is applied to a surface of the metal shaft at positions where the plural worm gears are formed by molding.

(9) In the drive mechanism of an image forming apparatus of the present invention, the metal shaft is provided with projection portions having a given height at plural positions thereof where the plural worm gears which are sequentially pressfitted are mounted.

(10) In the drive mechanism of an image forming apparatus of the present invention, the drive mechanism includes fastening members which prevent the movement of the worm gears in the axial direction of the metal shaft.

(11) In the manufacturing method of a worm gear set of the present invention, the step for forming the plural worm gears includes the formation of helically threaded portions by cutting the solidified resin.

(12) In the manufacturing method of a worm gear set of the present invention, in the step for filling the resin, the resin is filled until the resin embeds gate lands having large wall thickness portions and, thereafter, by way of film gates having small wall thickness portions and connected to the gate lands, the resin is filled into portions for forming the worm gears which cover the circumference of the metal shaft and are connected to the film gates.

(13) In the manufacturing method of a worm gear set of the present invention, the manufacturing method further includes a step for forming the helical threads in the resin preforms by cutting when the helical threads are not yet formed in the resin preform to be pressfitted over the metal shaft.

(14) In the manufacturing method of a worm gear set of the present invention, the manufacturing method further includes a step for applying a fastening treatment for preventing the displacement of the resin preforms in the axial direction of the metal shaft after pressfitting the resin preforms over the metal shaft.

The entire disclosure of Japanese Patent Application No. 2003-325784 filed on Sep. 18, 2003 including specification, claims, drawings and abstract is incorporated herein by reference in its entirety.

What is claimed is:

1. An image forming apparatus comprising:
   a plurality of image carriers that are arranged in parallel;
   a common drive source that drives the plurality of image carriers;
   a drive shaft that is connected to and driven by the drive source;
   a plurality of worm gears that are provided corresponding to the plurality of image carriers and are formed coaxially with the drive shaft; and
   a plurality of worm wheels that are respectively meshed with the respective worm gears and respectively transmit drive forces of the worm gears to the image carriers,
   wherein the plurality of worm gears are made of a resin material,
   the worm gears and the worm wheels drive the plurality of image carries by making use of the elastic deformation of the worm gears when the worm gears and the worm wheels are respectively meshed with each other,
   the drive shaft is made of a metal material,
   the plurality of worm gears are fixed to the drive shaft by pressfitting molded resin over the drive shaft, and
   the drive shaft differs in a diameter thereof corresponding to positions where the plurality of worm gears are pressfitted.

2. A drive mechanism of an image forming apparatus comprising:
   a metal shaft that is used as a drive shaft for simultaneously driving a plurality of constitutional members in the image forming apparatus; and a plurality of worm gears that are coaxially mounted on the metal shaft and transmit a driving force to respective shafts of the plurality of constitutional members, the plurality of worm gears being made of a resin material which is sequentially pressfitted over the metal shaft, wherein the plurality of worm gears have helically threaded portions on an outer peripheral portion of the resin material, and at a plurality of positions where the plurality of worm gears to be sequentially pressfitted are mounted on the metal shaft, the metal shaft has a larger diameter at the positions close to a center portion than at the positions close to both end portions thereof.

3. A drive mechanism of an image forming apparatus according to claim 2, wherein the metal shaft is provided with projection portions having a given height at the plurality of positions thereof where the plurality of worm gears which are sequentially pressfitted are mounted.

4. A drive mechanism of an image forming apparatus according to claim 2, wherein the drive mechanism includes fastening members which prevent the movement of the worm gears in the axial direction of the metal shaft.

5. A manufacturing method of a worm gear set for coaxially forming not smaller than three worm gears on a metal shaft, the method comprising:

a step for cutting the metal shaft in which out of portions of the metal shaft where the worm gears are formed, a shaft diameter of the portions at a center side of the metal shaft is large and a shaft diameter of the portions at both end sides of the metal shaft is small; and a step for sequentially pressfitting resin-made preforms over the cut metal shaft before or after forming helical threads.

6. A manufacturing method of a worm gear set according to claim 5, wherein the manufacturing method further includes a step for forming the helical threads in the resin preforms by cutting when the helical threads are not yet formed in the resin preform to be pressfitted over the metal shaft.

7. A manufacturing method of a worm gear set according to claim 5, wherein the manufacturing method further includes a step for applying a fastening treatment for preventing the displacement of the resin preforms in the axial direction of the metal shaft after pressfitting the resin preforms over the metal shaft.

* * * * *